(12) United States Patent
Larsson

(10) Patent No.: US 7,574,814 B2
(45) Date of Patent: Aug. 18, 2009

(54) APPARATUS FOR ALIGNING LAPBOARD SIDING

(76) Inventor: Lars N. Larsson, 4003 Paseo Luisa, Palm Springs, CA (US) 92264

( * ) Notice: Subject to any disclaimer, the term of this patent is extended or adjusted under 35 U.S.C. 154(b) by 0 days.

(21) Appl. No.: 12/221,928

(22) Filed: Aug. 8, 2008

(65) Prior Publication Data

US 2009/0178290 A1    Jul. 16, 2009

Related U.S. Application Data

(60) Provisional application No. 61/011,251, filed on Jan. 16, 2008.

(51) Int. Cl.
*G01D 21/00* (2006.01)
(52) U.S. Cl. .......................... 33/647; 33/648
(58) Field of Classification Search ............ 33/647, 33/645, 649, 573, 333–334, 533, 568, 518, 33/613; 52/547, 548, 408, 105, 99
See application file for complete search history.

(56) References Cited

U.S. PATENT DOCUMENTS

| | | | | | |
|---|---|---|---|---|---|
| 239,390 | A | * | 3/1881 | Kivett | 33/647 |
| 248,460 | A | * | 10/1881 | Harris | 33/411 |
| 325,811 | A | * | 9/1885 | Benson | 33/647 |
| 334,363 | A | * | 1/1886 | Ervin | 33/647 |
| 351,722 | A | * | 10/1886 | Trueblood | 33/647 |
| 386,329 | A | * | 7/1888 | Luce | 33/646 |
| 774,114 | A | * | 11/1904 | Spear | 33/411 |
| 3,133,357 | A | * | 5/1964 | Gayan | 33/647 |
| 4,862,669 | A | * | 9/1989 | Jacobsen | 52/749.1 |
| 4,899,459 | A | * | 2/1990 | Taggart | 33/646 |
| 5,305,532 | A | * | 4/1994 | Johnson et al. | 33/647 |
| 5,319,909 | A | * | 6/1994 | Singleterry | 52/749.1 |
| 7,159,328 | B1 | * | 1/2007 | Duda | 33/647 |

* cited by examiner

*Primary Examiner*—Yaritza Guadalupe-McCall
(74) *Attorney, Agent, or Firm*—I. Michael Bak-Boychuk

(57) ABSTRACT

A pair of generally linear templates each includes one vertical edge convolved in substantially identical stepped convolutions that are each respectively conformed to support the lower end edges of an array of lapboards on the exterior of a building wall structure. Each of the templates include a set of laterally offset attachment brackets provided with spring opposed fasteners that are useful to temporarily secure the templates to the wall structure at a securement interval that is greater than the span of the lapboards, thus exposing the lapboard ends for their proper alignment as the lapboards are affixed to the wall structure.

12 Claims, 2 Drawing Sheets

APPARATUS FOR ALIGNING LAPBOARD SIDING

REFERENCE TO RELATED APPLICATIONS

This application obtains the benefit of the earlier filing date of U.S. Provisional Application Ser. No. 61/011,251 filed on Jan. 16, 2008.

BACKGROUND OF THE INVENTION

1. Field of the Invention

The present invention relates to siding support fixtures, and more particularly to temporarily attached supports conformed to engage the ends of an array of siding boards extending in a vertically spaced alignment in a horizontal direction from the corner edges of a building structure.

2. Description of the Prior Art

The exterior surfaces of building structures are often protected and shielded from the weather by an outer siding veneer generally formed by fastening in a partially overlapping arrangement horizontally aligned siding boards. Since this veneer then defines the exterior building appearance substantial attention is devoted to the accuracy of the board alignment, their relative vertical spacing and particularly to their edge detail at the corners of the building. Accordingly, various alignment fixtures have been devised in the past to assist in this tedious and time consuming task.

To assist with the spacing and level alignments various devices have been proposed in the past which in one way or another lift or hold the siding boards as they are nailed to the building. While most frequently the vertical spacing is effected in a one-by-one spacing reference to the board being lapped, the cumulative measurement errors have often led to alignments that visibly depart from the true level to create visually unpleasant results. In consequence various alignment tools have been proposed in the past which suspend a vertical grouping of overlapping siding boards, exemplified by U.S. Pat. Nos. 5,319,909 to Singleterry; 4,862,669 to Jacobsen; 1,989,141 to Leonard; 4,155,175 to Stiles; published US application 2002/0100181 by Evans; and others.

While suitable for the purposes intended, each of the foregoing is temporarily affixed to the building wall by attachments that are vertically aligned with the holding tool itself and are therefore obstructing the access to the equally important wall corner detail. Board alignment tooling that is temporarily easily affixed by an offset suspension is therefore extensively desired and it is one such tooling that is disclosed herein.

SUMMARY OF THE INVENTION

Accordingly, it is the general purpose and object of the present invention to provide an array of alignment tools conformed for releasable offset mounting either to the corner finishing pieces or to a temporary attachment frame in order to expose the lapboard edge finish. Other and further object will become apparent from the teachings and illustrations that follow below.

Briefly, these and the other objectives are achieved by a matching paired set of siding support planar strips each shaped to provide a set of equally spaced siding board supports on one or more of its vertical edges and each including a set of opposingly spaced laterally extending fastening brackets provided with spring loaded fastener inserts. The fastening brackets are then positioned in vertical alignment either onto the finishing vertical strips that define the wall corners, or onto temporary framing pieces in those instances where the lapboards are joined at a 45 degree corner finish. Once the board ends are thus secured their intermediate overlap spacing can then be manually carried out.

Those skilled in the art will appreciate that the foregoing offset fastening arrangement leaves the board ends virtually exposed, thus providing access for any finishing adjustments and alignments that are so important in creating a well finished appearance. Moreover, this offset suspension allows for a fastening placement selection that is visually obscured with the spring loaded inserts further minimizing the residual fastening signature.

BRIEF DESCRIPTION OF THE DRAWINGS

FIG. 4 is a side view of one inventive siding board aligning tool; and

DESCRIPTION OF THE SPECIFIC EMBODIMENT

Figure 1:
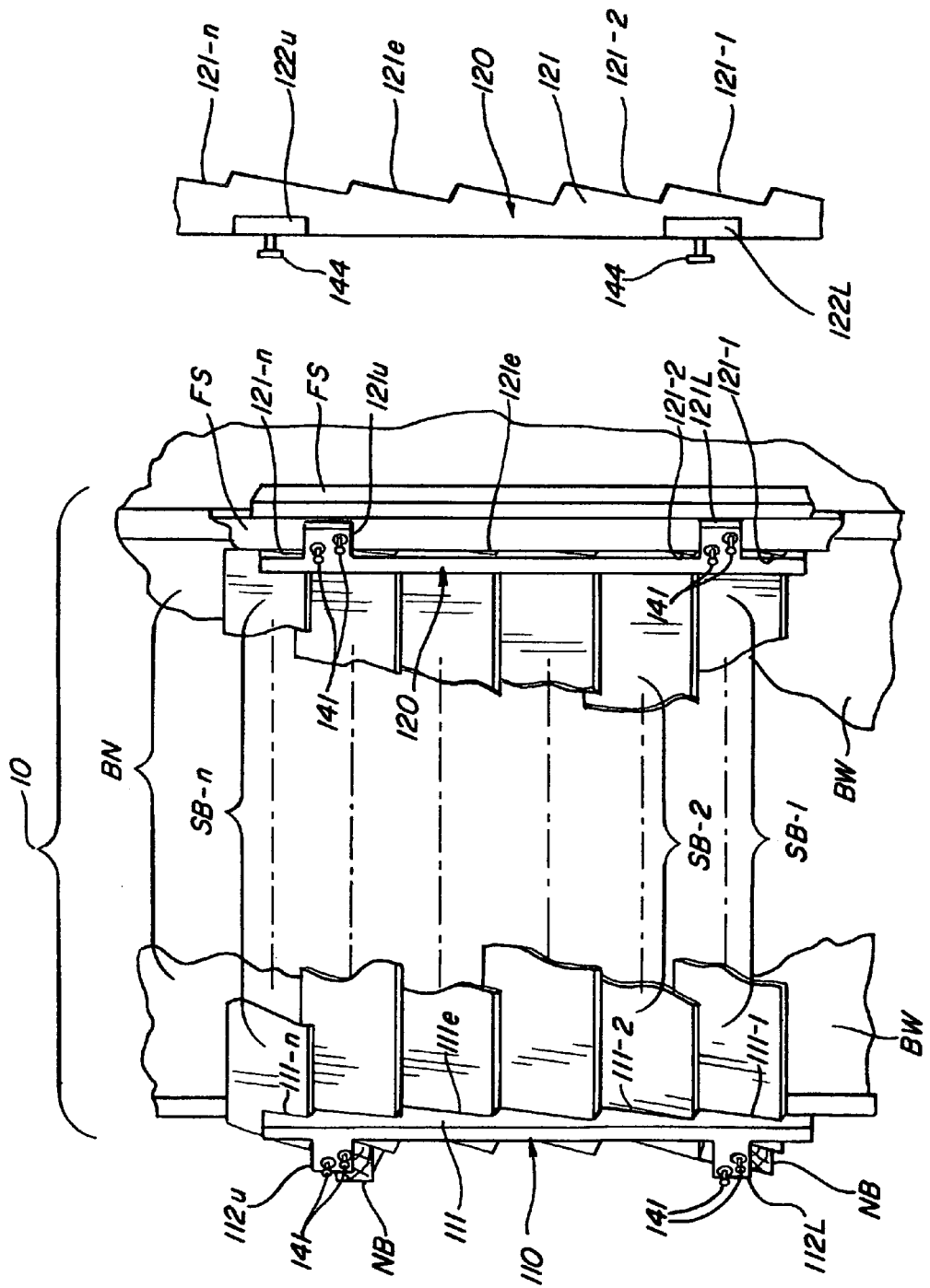
FIG. 1 is a perspective illustration of the inventive siding alignment tooling array in its fastened deployment on a building wall.
Figure 2:
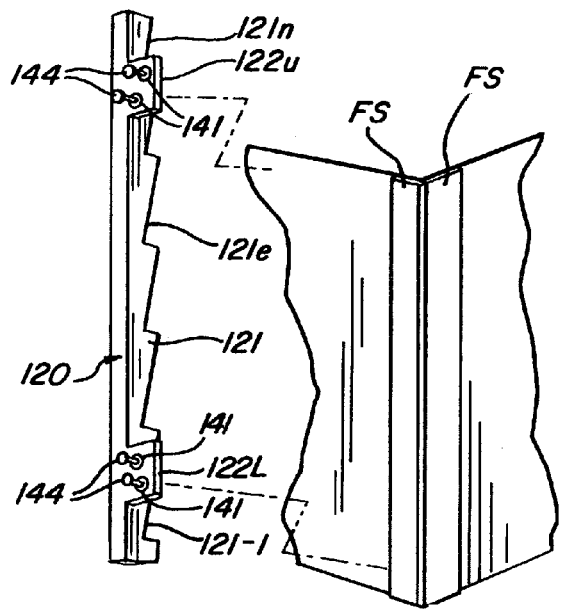
FIG. 2 is a further perspective illustration, separated by parts, of one siding alignment tool in accordance with the present invention.

As shown in FIGS. 1-5, the inventive tooling array, generally designated by the numeral 10, comprises a first and a second generally elongate siding board alignment tool 110 and 120 each including a corresponding elongate and generally rectangular lapping template 111 and 121 having at least one edge 111e and 121e shaped as a sequence of convolutions 111-1 through 111-n and 121-1 through 121-n. Each of these convolutions 111-1 through 111-n and 121-1 through 121-n are shaped and correspond to the desired sectional profile of a properly spaced and overlapped placement of siding boards SB-1 through SB-n on the exterior of a building wall BW.

It will be appreciated that customary siding practices allow several options in the edge treatment detail which are mainly determined by the aesthetic or appearance choices of the architect or building owner. Most frequently, these edge treatment choices fall into one of two categories, i.e., a mitered siding board edge, or a corner that is finished off by vertical finishing strips FS, with the first or mitered edge option illustrated in FIG. 1 adjacent the alignment template 111 while the second or finished option is shown adjacent template 121. In both these instances, however, there is little vertical space for the temporary attachments for each template.

To obtain unobstructed convenience in the insertion of successively lapped siding boards SB into their corresponding convolutions 111-1 through 111-n and 121-1 through 121-n each of the templates 111 and 121 is provided with upper and lower laterally offset, generally rectangular attachment brackets, respectively shown as brackets 112U and 112L for template 111 and 122U and 122L for the other template. Of course, since the usual alignment task entails close attention to the horizontal placement of the siding boards SB both the templates 111 and 121 are used in complementing pairs and the offset directions for brackets 112U and 112L is therefore opposite to the offset direction of brackets 122U and 122L. Moreover, to allow for convenient attachment onto already mounted or other existing siding these attachments are preferably aligned vertically along each template at the convolution point right below the lower edge of a board SB.

Each of these attachment brackets 112U, 112L, 122U and 122L, moreover, includes one or more cylindrical insert 141 threadably fitted into corresponding openings 142 formed through the full bracket thickness, each insert deploying a spring biased fastener 144 which can be hammered into the edge strips FS or temporary nailing blocks NB that are attached in those instances where no corner finishing is provided, as in a mitered corner.

Figure 3:
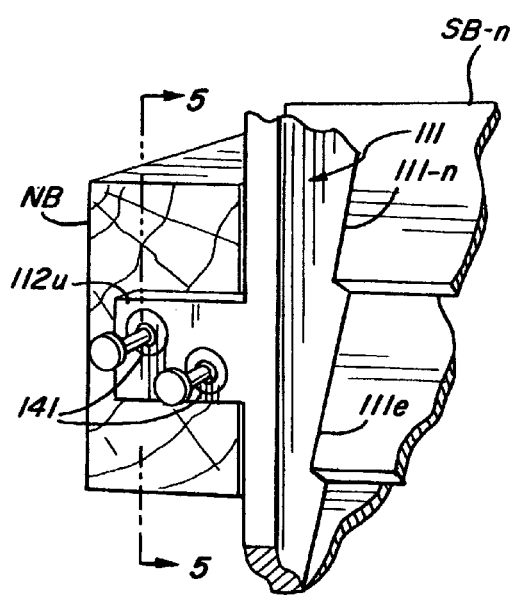
FIG. 3 is a perspective detail view of one offset attachment fixture in accordance with the present invention.
Figure 5:
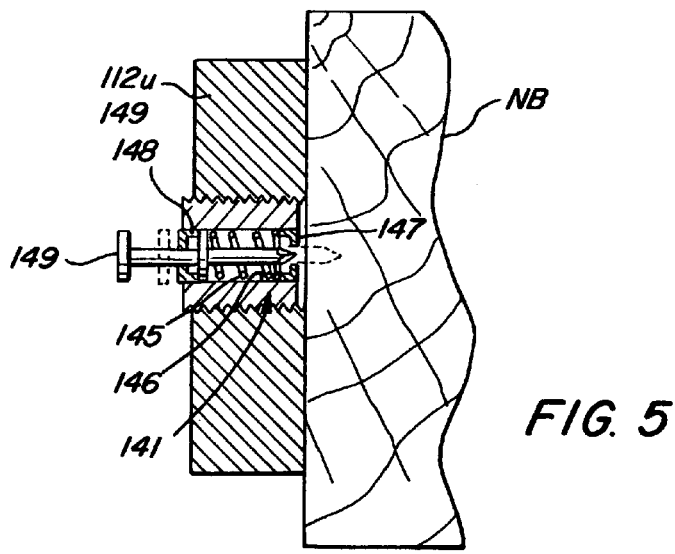
FIG. 5 is a sectional view taken along line 5-5 of FIG. 3.

More precisely, and by particular reference to FIGS. 3 and 5 illustrating, by way of example, the temporary attachment of bracket 112U to its nailing block NB, each of these cylindrical inserts 141 may include a central bore 146 in which a helical spring 145 is retained by an inner annular cap 147 at the bore end adjacent block NB and an inner flange 148 around a the fastener 144 extending through the spring and cap annuli in accordance with its linear translation. The fastener is trapped between an outer annular cap 143 and the end of spring 145 such that the point of the fastener is urged inwardly within the insert interior until the fastener is driven into and captured in the desired structure by a hammer blow on the exposed head 149 at the outer, exposed fastener end.

Like numbered parts functioning in a like manner to that described above, this same manner of attachment is effected by each of the other inserts 141 embedded in the other brackets 112L, 122U and 122L. In this manner any desired temporary attachment of each of the templates 111 and 121 can be conveniently effected and once the siding boards aligned thereby are attached each of the templates is released by withdrawing the fasteners from their temporary engagement.

It bears emphasis that the foregoing alignment process obscures only minimally the siding boards that are being mounted. Accordingly, once the board end positions are aligned and fastened the ends are easily accessed, both where mitered and those adjacent the finishing pieces, for any caulking and sealing operations. Once the horizontal alignment of the lowest siding board SB is set the board centers between the fastened and aligned ends of the other boards can be easily vertically adjusted relative this reference by any known alignment tool like that exemplified in U.S. Pat. No. 6,705,021 issued on Mar. 16, 2004, to Nadal et al.

One may note further that the temporary attachment by way of inserts 141 may be otherwise achieved, as for example by fasteners projecting through spring tabs that are cantilevered from the template edge, or from its attachment brackets, and other similar structures that allow quick fastener withdrawal once the current wall surface is done. In each instance such provisions allow for a repeated use, greatly simplifying this tedious task.

In this manner the inventive tooling array renders the tedious task of installing lapped siding convenient, allowing the performance thereof by a single worker without any sacrifice in precision and in workmanship quality. Simply, once the siding board and its overlap are selected and a horizontal reference is provided an appropriately shaped set of templates 111 and 121 is them temporarily attached to the building wall. Thereafter a single worker can insert the boards one after another, aligning and fully fastening each. The fastened and aligned boards then provide the further, higher horizontal reference onto which the raised templates are reattached. All these and other conveniences are obtained in a structure that is simple and therefore extremely reliable.

Obviously many modifications and variations of the instant invention can be effected without departing from the spirit of the teachings herein. It is therefore intended that the scope of the invention be determined solely by the claims appended hereto.

I claim:

1. Apparatus for positioning in an aligned overlapping relationship on a building wall structure a plurality of lapboard siding pieces while effecting the attachment thereof to said wall structure, comprising:
   a first and second template each of an elongate linear form and each including a first longitudinal edge convolved in generally equally shaped stepped edge convolutions each conformed to receive the exposed end portions of said lapboard pieces;
   a plurality of first and second attachment brackets respectively extending in opposing lateral directions from the corresponding ones of said first and second templates; and
   attachment means affixed in each said first and second brackets and conformed for releasable attachment to said wall structure distal of the ends of said lapboard pieces.

2. Apparatus according to claim 1, wherein:
   each said attachment means includes a piercing fastener opposed in its piercing progression by a spring.

3. Apparatus according to claim 2, wherein:
   each said stepped convolution is formed to engage in a supporting engagement the lower edge of the corresponding one of said lapboard pieces.

4. Apparatus according to claim 1, wherein:
   each said first and second template include a second edge formed in a generally distal opposition to said first edge; and
   each said first and second brackets are generally deployed proximate the corresponding ones of said second edges.

5. Apparatus according to claim 4, wherein:
   each said attachment means includes a piercing fastener opposed in its piercing progression by the urging of a spring.

6. Apparatus according to claim 5, wherein:
   each said stepped convolution is formed to engage in a supporting engagement the lower edge of the corresponding one of said lapboard pieces.

7. Apparatus for temporarily affixing in an aligned overlapping relationship on a building wall structure a plurality of lapboard siding pieces while effecting the attachment of the ends thereof to said wall structure, comprising:
   a first and second template each of an elongate linear form and each including a front and rear longitudinal edge, each said front edge including generally equally shaped stepped edge convolutions each conformed to receive an exposed end portion of a corresponding one of said lapboard pieces;
   a plurality of first and second attachment brackets formed to extend in respectively opposing lateral directions from the corresponding second edges of said first and second templates; and
   attachment means mounted on each said first and second brackets and conformed for releasable attachment to said wall structure distal of the ends of said lapboard pieces.

8. Apparatus according to claim 7, wherein:
   each said attachment means includes a piercing fastener opposed in its piercing progression by a spring.

9. Apparatus according to claim 8, wherein:
   each said stepped convolution is formed to engage in a supporting engagement the lower edge of the corresponding one of said lapboard pieces.

10. An installation support assemblage useful in aligning lapboard pieces on the exterior of a wall structure for attachment thereto, comprising:

a pair of linear templates each including a series of stepped convolutions along one vertical edge thereof each conformed to receive an exposed end portion of a corresponding one of said lapboard pieces by engaging the lower edges of each said piece on a corresponding step in said convolutions to define a predetermined overlapping spacing thereof;

a plurality of attachment brackets formed to extend in respectively opposing lateral directions from the corresponding ones of said linear templates; and attachment means mounted on each said brackets and conformed for releasable attachment to said wall structure distal of the ends of said lapboard pieces.

11. Apparatus according to claim 10, wherein:

each said attachment means includes a piercing fastener opposed in its piercing progression by a spring.

12. Apparatus according to claim 11, wherein:

each one of said pair of linear templates include a second vertical edge formed in a generally distal opposition to said one edge; and each brackets are positioned generally proximate the corresponding ones of said second edges.

\* \* \* \* \*